A. O. LOMBARD.
TRACTION ENGINE.
APPLICATION FILED JUNE 25, 1910.

1,063,364.

Patented June 3, 1913.

3 SHEETS—SHEET 1.

Witnesses:
Edna C. Cleveland
Nathan C. Lombard

Inventor:
Alvin O. Lombard,
by Walter E. Lombard, Atty.

A. O. LOMBARD.
TRACTION ENGINE.
APPLICATION FILED JUNE 25, 1910.
1,063,364.
Patented June 3, 1913.
3 SHEETS—SHEET 2.
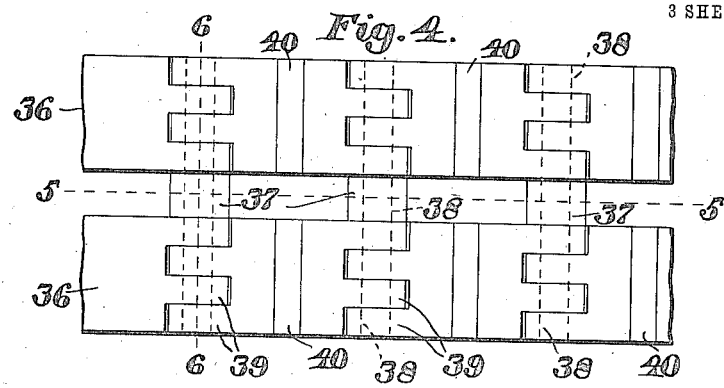
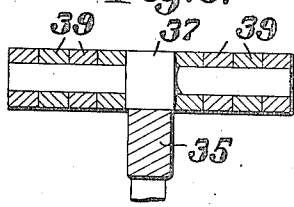
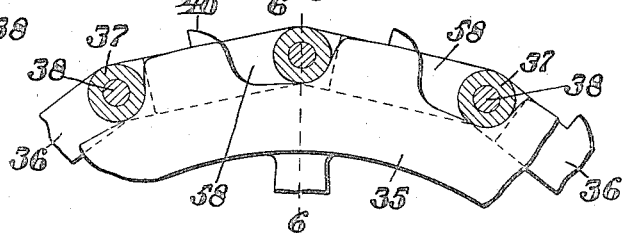
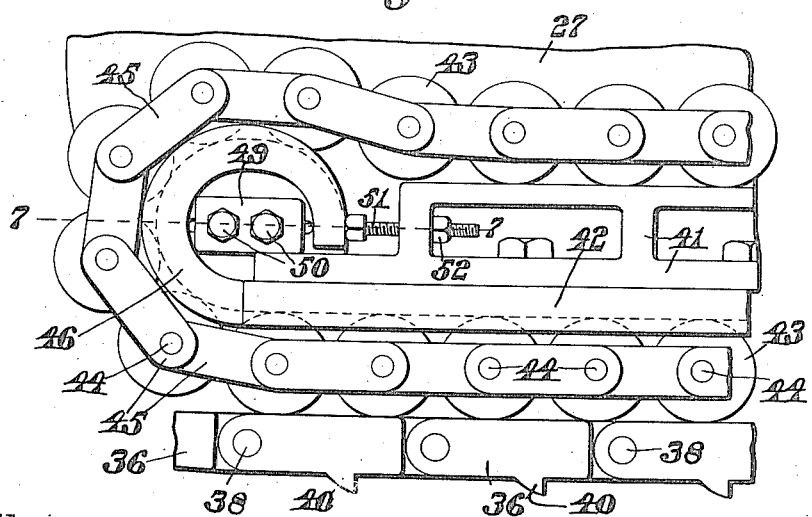
Witnesses:
Nathan P. Lombard
Edna C. Cleveland
Inventor:
Alvin O. Lombard,
by Walter E. Lombard,
Atty.

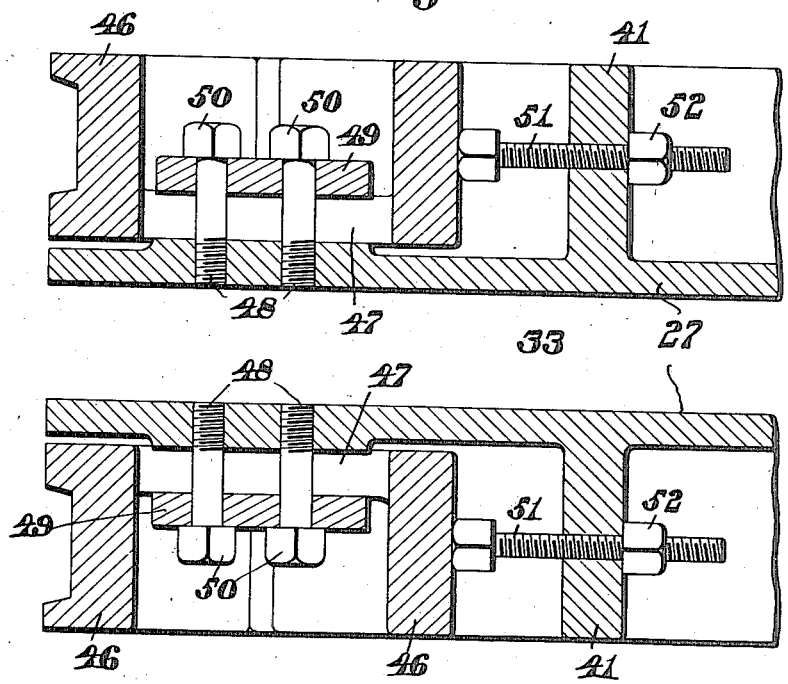

UNITED STATES PATENT OFFICE.

ALVIN O. LOMBARD, OF WATERVILLE, MAINE.

TRACTION-ENGINE.

1,063,364.   Specification of Letters Patent.   Patented June 3, 1913.

Application filed June 25, 1910. Serial No. 568,895.

*To all whom it may concern:*

Be it known that I, ALVIN O. LOMBARD, a citizen of the United States of America, and a resident of Waterville, in the county of Kennebec and State of Maine, have invented certain new and useful Improvements in Traction-Engines, of which the following is a specification.

This invention relates to traction engines and has for its object the production of a device of this class which is especially adapted for drawing a plurality of caravans over rough roads.

One of its objects is to simplify the construction of a device of this class and to distribute the load over the surface of the road and to this end the tractor is located midway of the chassis and at its rear end so that it never follows in the path of the steering wheels but in a path intermediate thereof.

The invention consists in certain novel features of construction and arrangement of parts which will be readily understood by reference to the description of the drawings and to the claims hereinafter given.

Figure 1:
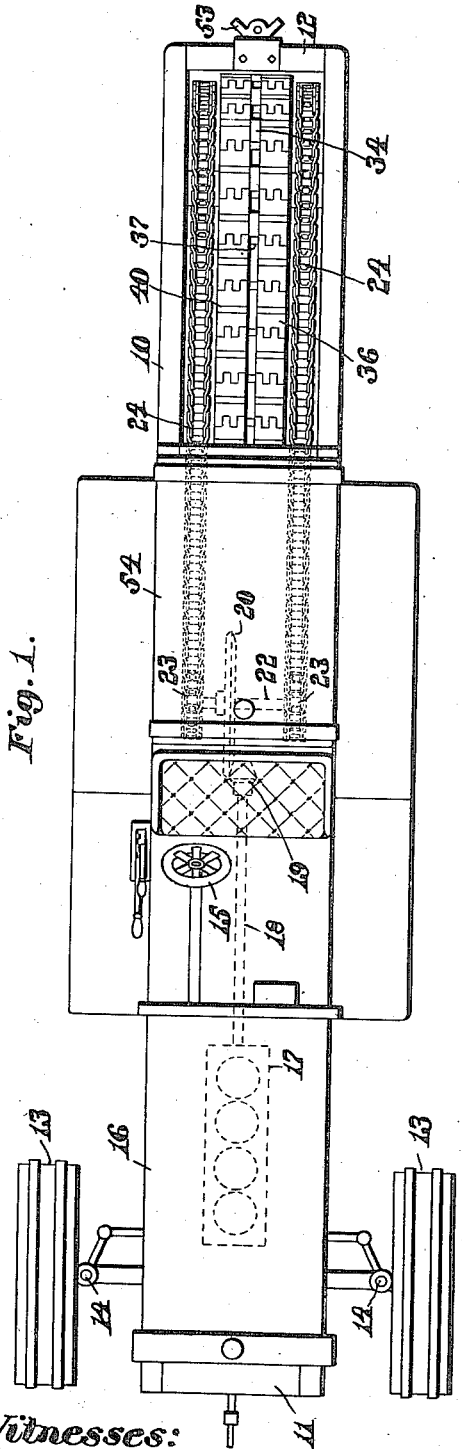
Figure 2:
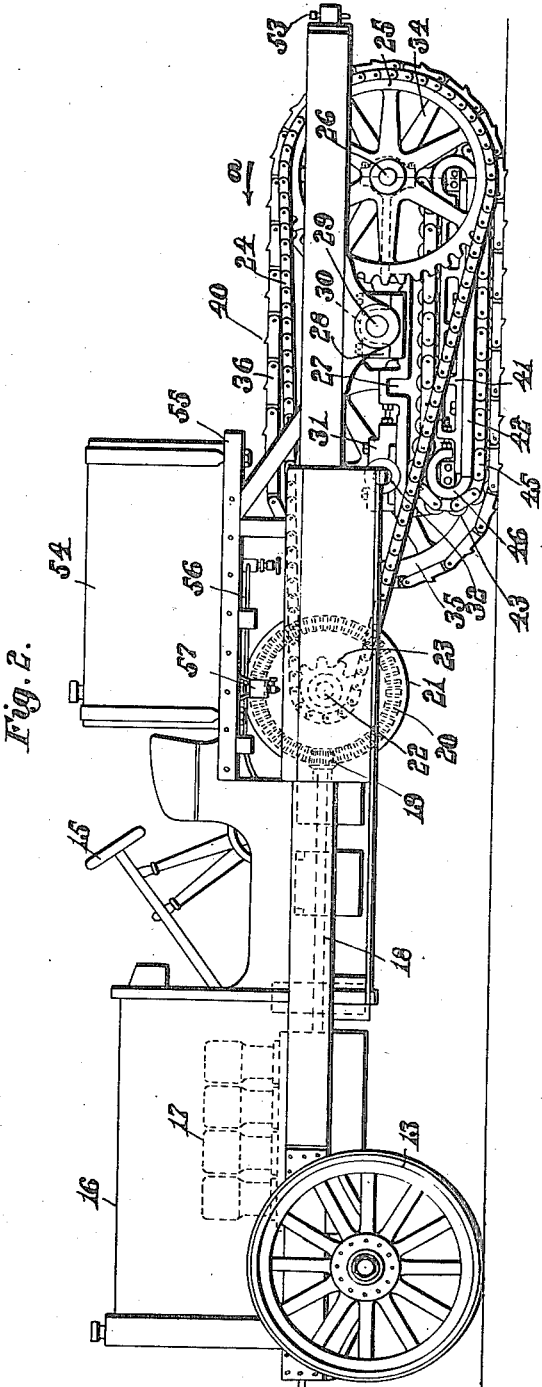

Of the drawings: Figure 1 represents a plan view of a traction engine embodying the features of the present invention. Fig. 2 represents a side elevation of the same. Fig. 3 represents an elevation of a portion of the tractor showing the intermediate rollers between the flexible traction belt and the supporting frame thereof. Fig. 4 represents a plan view of a portion of the traction belts showing the method of connecting the two together. Fig. 5 represents an elevation of a portion of a traction belt sprocket wheel and a portion of the traction belt coöperating therewith. Fig. 6 represents a transverse section of the same, the cutting plane being on line 6—6 on Figs. 4 and 5, and Fig. 7 represents a horizontal section of the forward end of the tractor frame, showing the means of taking up the slack in the intermediate roller system.

Similar characters designate like parts throughout the several figures of the drawings.

In the drawings, 10, 10 represent side frames forming with the cross-bars 11, 12, a chassis the forward end of which is supported by the wheels 13 adapted to be moved about the pivots 14 by means of the steering wheel 15 in any well-known manner. On top of the forward end of the chassis is a casing 16 within which is mounted an engine 17 of any well-known construction which revolves a shaft 18 mounted in suitable bearings and extending toward the rear of the chassis. To the rear end of this shaft 18 is secured a bevel pinion 19 meshing with a bevel gear 20 within a casing 21 and secured to a revoluble shaft 22. On each end of this shaft 22 is a sprocket wheel 23 with each of which engages a sprocket chain 24 passing around a sprocket wheel 25 secured to a shaft 26 in bearings in the rear end of the tractor frame 27. This frame 27 has adjustably secured thereto bearings 28 for a shaft 29 supported in bearings 30 secured to the side frames 10 of the chassis.

At the front end of the tractor frame 27 is secured bearings 31 for a shaft 32. In slots 33 in the front and rear ends of the tractor frame 27 and secured to the shafts 26 and 32 are sprocket wheels 34 and 35. On these sprocket wheels 34 and 35 are mounted a pair of flexible traction belts 36, 36, slightly separated by a plurality of rollers 37 mounted upon the hinge pins 38 extending through the ears 39 of the various sections forming said traction belt and thereby pivotally connecting said sections together. Intermediate the ends of each section is a rib 40 adapted to engage with the surface of the ground over which the tractor is moving and secure a hold thereon. The tractor frame 27 is provided with outwardly extending flanges 41 to the lower horizontal flange of which is secured a runner member 42 against which the intermediate roller system bears. This system consists of rollers 43 mounted upon pins 44 and connected together on either side of said rollers by the links 45, making a continuous system of rollers movable about the frame 27 and interposed at one point between the runner member 42 and that portion of the flexible traction belt 36 that is in engagement with the surface of the road over which the traction engine is passing. The slack in this roller system is taken up by means of a curved end plate 46 having a slot 47 therein through which extend the bolts 48 threaded at their inner ends to the tractor frame 27, a friction plate 49 being interposed between the heads 50 of said bolts and the outer side faces of said plates 46. When the end plate 46 has been adjusted into its desired position and clamped by means of the bolts 48 the threaded member 51 is adjusted into engagement with the inner end of the plate 46 and is locked in position by the nut 52, this threaded member and nut 52 preventing any accidental displacement of the plate longitudinally of the frame 27. To the cross bar 12 is secured a suitable coupling 53 by which the trucks desired to be hauled may be coupled to the traction engine.

A gasolene tank 54 is secured to the frame 55 supported above the chassis, gasolene from this tank being supplied to the engine in any well-known manner through the supply pipe 56. An oil tank 57 is located above each sprocket chain 24 and oil is supplied from this tank to the chain as the vehicle moves along the road. Owing to the position of the tractor at the extreme rear end of the chassis and the strain of the vehicles coupled to the rear end of said chassis, the tractor is pulled down into contact with the ground and secures a firm hold thereon as the engine is advancing.

A great advantage has been found in constructing the engine in this manner with the tractor intermediate the side frames of the chassis as by so doing the tractor does not follow in the path of the front wheels 13 but moves in a path independent and intermediate thereof. By doing this the making of deep ruts in the road is obviated as the weight of the device is better distributed and it has been found in practice that the traction engine works better with this three-point suspension than has been the case where a pair of tractors has been used, one on either side of the chassis and following in the path of the front wheels. In such cases the front wheels themselves sustaining part of the weight, make ruts in the road and the tractors following in the same path increase these ruts so that the advancement of the traction engine itself is prevented and becomes stalled while the wheels of the caravans or trucks being drawn also sustaining heavy weights are liable to sink still farther in the ruts thus formed.

It will be observed that in the present construction the bulk of the weight upon the engine when drawing a plurality of caravans is at its extreme end and that this weight will pull the tractor down so that it gets a firm hold upon the ground and as the flexible traction belt is moved in the direction of the arrow "a" on Fig. 2, the traction engine will be caused to advance and the load on the trucks or caravans will be pulled readily. As the most of the weight thus sustained is at the rear of the chassis it is obvious that the front wheels will not be so liable to form ruts in the road and as a consequence the wheels of the caravans following will practically pass over fresh ground free from such ruts.

The spaces 58 in the tractor sprocket wheels are elongated and the rollers 37 therein occupy but a portion of said spaces so that there is no chance for these spaces to be filled up with mud and dirt and interfere with the operation of the tractor belt 36. Owing to the length of the spaces relative to the diameter of the rollers when any dirt or other material becomes embedded in the space 58 the chains 36 are permitted to slip slightly in these spaces and as the rollers 37 forming a part thereof turn the substances embedded therein will be removed. Heretofore these flexible traction belts have been made in one piece and the parts on either side of the sprocket wheels 34 and 35 have been made integral but it has been found in practice that this was detrimental as the strain brought to bear at times on one side of the traction belt was greater than on the other side and the mud and other substances getting into the spaces between the teeth of the sprocket wheels and the openings through the belt sections would strain the sections until they became broken. With the present construction this objection is entirely obviated.

It is believed that the operation and many advantages of the invention will be fully apparent from the foregoing.

Having thus described my invention, I claim:

1. In a traction engine, a tractor consisting of a frame having central slots at each end; a sprocket wheel in each slot; two separated traction belts movable about said frame and in the same plane therewith; pivot pins connecting said belts together; rollers on said pins between said belts and engaging said sprocket wheels; and means for driving said sprocket wheels.

2. In a traction engine, a tractor consisting of a frame having central slots at each end; a sprocket wheel in each slot having elongated spaces between the teeth; two separated traction belts movable about said frame; pivot pins connecting said belts together; rollers on said pins between said belts and engaging said sprocket wheels, said rollers occupying but a portion of the spaces between the teeth; and means for driving said sprocket wheels.

3. In a traction engine, a tractor consisting of a frame having central slots at each end; a sprocket wheel in each slot; a traction belt movable about said frame; a curved end plate at one end of said frame having an elongated slot therethrough; clamping bolts secured to said frame and extending through said slot; a plurality of rollers movable independently of said traction belt over said frame and curved plate and interposed between them and said traction belt; and means for adjusting the position of said end plate relative to said frame.

4. In a traction engine, a tractor consisting of a frame composed of two separated parallel runners each having an outward extension thereon; bearings in opposite ends of said runners, revoluble shafts therein; a sprocket wheel secured to each shaft between said runners; curved members adjustable on each runner relative to the ends of said extensions; a flexible traction belt on each runner; pivot pins connecting the two traction belts; sprocket engaging rollers on said pivot pins; a roller clamping chain surrounding each extension and the curved members at each end thereof, the rollers of said chains being interposed between said extensions and said traction belts.

Signed by me at Waterville, Me., this 23rd day of June, 1910.

ALVIN O. LOMBARD.

Witnesses:
 CLARA E. BREWSTER,
 GRACE L. VOSE.